(12) United States Patent
Howard et al.

(10) Patent No.: US 6,348,686 B1
(45) Date of Patent: Feb. 19, 2002

(54) ADAPTER FOR POSITIONING A LENS

(75) Inventors: Carol A. Howard, Oxford; Ward E. Strang, Fairfield, both of CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/352,772

(22) Filed: Jul. 14, 1999

(51) Int. Cl.$^7$ .................................................. H01J 5/02
(52) U.S. Cl. ...................................... 250/239; 250/216
(58) Field of Search ............................... 250/239, 216, 250/208.1, 221, 222.1, 208.2

(56) References Cited

U.S. PATENT DOCUMENTS

| | | |
|---|---|---|
| 4,604,524 A | 8/1986 | Kotlicki et al. |
| 4,672,206 A | 6/1987 | Suzuki et al. |
| 4,795,908 A | 1/1989 | Morimoto et al. |
| 4,896,039 A | 1/1990 | Fraden |
| 4,939,359 A | 7/1990 | Freeman |
| 4,960,995 A | 10/1990 | Neumann et al. |
| 4,990,768 A * | 2/1991 | Ito et al. ...................... 250/239 |
| 5,015,994 A | 5/1991 | Hoberman et al. |
| 5,026,990 A | 6/1991 | Marman et al. |
| 5,103,346 A | 4/1992 | Chang |
| 5,128,654 A | 7/1992 | Griffin et al. |
| 5,266,807 A | 11/1993 | Neiger |
| 5,414,255 A | 5/1995 | Hampson |
| 5,442,178 A | 8/1995 | Baldwin |
| 5,525,802 A | 6/1996 | Hoggins et al. |
| 5,567,942 A | 10/1996 | Lee et al. |
| 5,626,417 A | 5/1997 | McCavit |
| 5,662,411 A | 9/1997 | Haslam et al. |
| 5,739,753 A | 4/1998 | Porter |
| 5,757,004 A | 5/1998 | Sandell et al. |
| 5,764,146 A | 6/1998 | Baldwin et al. |
| 5,772,326 A | 6/1998 | Batko et al. |
| 5,780,854 A | 7/1998 | Lin |
| 5,783,815 A * | 7/1998 | Ikeda ...................... 250/208.1 |
| 5,790,040 A | 8/1998 | Kreier et al. |
| 5,844,240 A | 12/1998 | Lee et al. |

* cited by examiner

Primary Examiner—John R. Lee
(74) Attorney, Agent, or Firm—Jeffrey J. Howell; Mark S. Bicks; Alfred N. Goodman

(57) ABSTRACT

A multifunction adapter for use in a motion sensor module holds a lens at the front of the adapter in a predetermined position and distance relative to a sensor mounted on a circuit board, and uses positioning projections at the rear of the adapter to set a predetermined distance of the adapter from the sensor and the circuit board. The adapter can be adjusted to set the focal point of the lens at an optimized position for the sensor. Additionally, a cover that shrouds the sensor is present on the rear side of the adapter for reducing or eliminating air flowing across and around the sensor. When the sensor is a passive infrared device, the reduction in air flowing around and across the sensor reduces the number of false signals.

23 Claims, 5 Drawing Sheets

ADAPTER FOR POSITIONING A LENS

FIELD OF THE INVENTION

The invention relates generally to an adapter for positioning a lens. More specifically, the invention relates to an adapter in a motion sensor module for positioning a lens to a predetermined position relative to a sensor attached to a circuit board, and for shielding the sensor from air currents. The adapter is funnel-shaped, holds a lens on a front side, and has a shroud on the opposite back side for shielding the sensor from air currents. The shroud also has pins that are inserted through a circuit board for maintaining the adapter in a predetermined position, and each pin can have a stop that determines the distance between the lens and the sensor.

BACKGROUND OF THE INVENTION

Passive infrared sensors are commonly used in motion detectors to determine the presence or absence of individuals, generally determining if someone enters a zone of coverage. These detectors may be connected to security systems, and thereby alerting others of intrusion into the zone, or they may be connected to light switches, and may be used to turn lights on when a person is present in the zone, or deactivate the lights when a person is no longer present in the zone.

These motion detectors generally consist of a housing, and have a passive infrared sensor attached to a printed circuit board contained in the housing. A lens is positioned in front of the sensor, the lens focusing the infrared profile of a person as it moves across the field of view. The sensor is positioned near the focal point of the lens. A lens retainer allows the lens to be fixed in a predetermined position and assists in reflecting infrared towards the sensor.

However, tolerance buildup during manufacture can alter the predetermined lens position. Additionally, air currents passing over the sensor can result in false sensor readings. Consequently, there is a need for an adapter that accurately positions the lens to a predetermined focal point relative to the sensor, and a shroud for reducing or eliminating stay air currents from around the sensor.

Some examples of passive infrared motion detectors are U.S. Pat. No. 5,764,146 to Baldwin et al.; U.S. Pat. No. 4,672,206 to Suzuki et al.; U.S. Pat. No. 5,442,178 to Baldwin; U.S. Pat. No. 5,626,417 to McCavit; U.S. Pat. No. 5,772,326 to Batko et al.; U.S. Pat. No. 5,790,040 to Kreier et al; and U.S. Pat. No. 5,026,990 to Marman et al, the disclosures of which are incorporated herein by reference.

SUMMARY OF THE INVENTION

One object of the present invention is to provide an improved adapter for positioning a lens.

Another object of the present invention is to provide an improved adapter for positioning a lens having projections for positioning a lens a predetermined distance from a sensor.

The forgoing objects are basically attained by providing an adapter comprising a cover having a wall forming a hollow cavity and extending about the central axis; an extension coupled to and extending from the cover, the extension having a front side with a first opening and a back side with a second opening, the first opening being smaller than the second opening, the extension being attached to the cover at the back side with the second opening being aligned with the hollow cavity of the cover; and a plurality of projections coupled to the cover, each of the projections being spaced from each other and projecting from the cover in the direction of the central axis, opposite the extension.

The foregoing objects are also attained by providing a sensor assembly, comprising a circuit board; a sensor coupled to the circuit board; an adapter coupled to the circuit board and having a cover, an extension, and at least one projection, the cover having a wall extending around the sensor, the extension coupled to and extending from the cover and having a front side with a first opening and a back side with a second opening, the first opening being smaller than the second opening, the extension being attached to the cover at the back side with the second opening being aligned with the sensor, and the at least one projection coupled to the cover and attached directly to the circuit board.

The foregoing objects are also attained by providing a sensor assembly, having a circuit board; a sensor coupled to the circuit board, an adapter coupled to the circuit board; a lens coupled to the adapter; and means for accurately positioning the lens relative to the sensor and for prohibiting air currents from interfering with the functioning of the sensor.

Other advantages and salient features of the invention will become apparent from the following detailed description, which, when taken in conjunction with the annexed drawings, discloses preferred embodiments of the present invention.

BRIEF DESCRIPTION OF THE DRAWINGS

Referring to the drawings which form a part of the original disclosure.

DETAILED DESCRIPTION OF THE PREFERRED EMBODIMENT

Figure 1:
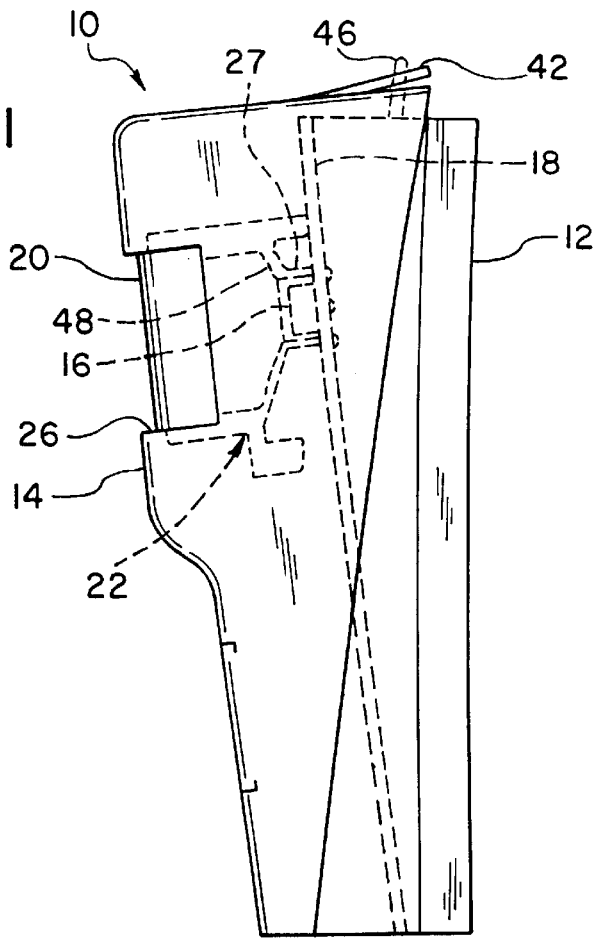
FIG. 1 is a side elevation view of a sensor module assembly showing a funnel, a circuit board and a sensor, constructed in accordance with the present invention.
Figure 2:
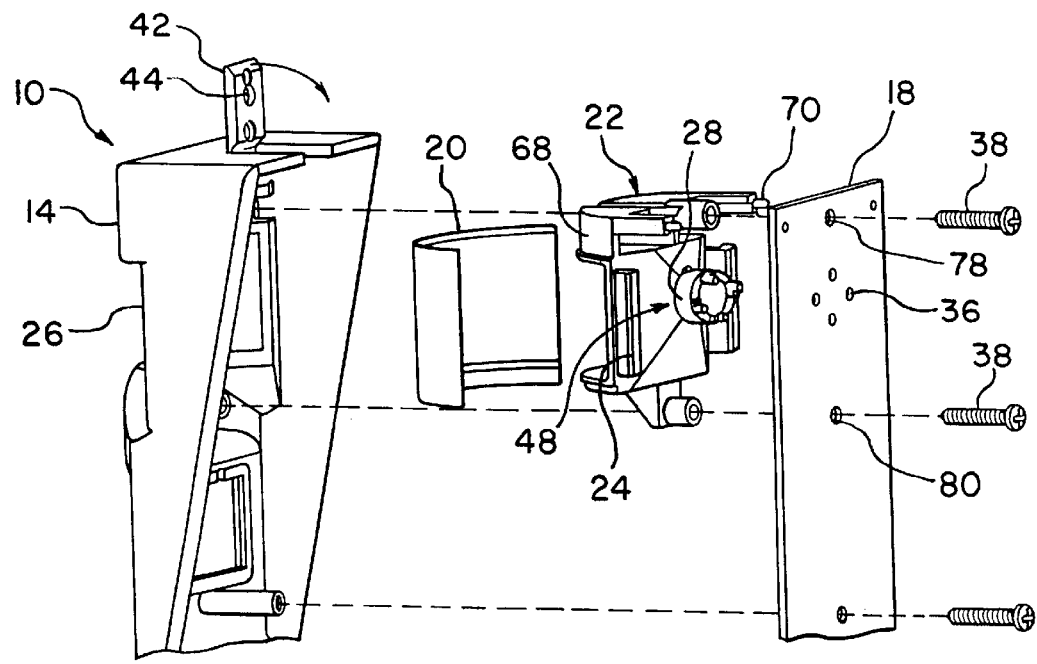
FIG. 2 is an exploded, partial, side, rear, top perspective view of the sensor module assembly in FIG. 1 with the housing in an open position.

FIGS. 1–4 depict a sensor module 10 according to this invention. The sensor module 10 comprises a rear housing member 12 which can be mounted to a mounting surface such as a wall of a house as known in the art, and a front housing member 14 which attaches to the rear housing member 12. A sensor 16 is mounted on a circuit board 18 within the sensor module 10 as generally known in the art. The sensor 16 can be any parameter sensor known in the art, such as passive infrared (PIR) sensor, ultrasonic sensor, temperature sensor, light sensor, relative humidity sensor, a sensor for the detection of carbon dioxide or other gasses or ions, an audio sensor, or any other passive or active sensor that can be used to detect movement or change from the nominal environment. For example, the sensor can detect changes in vibration or sound, temperature, visual, ionic and moisture conditions. In the preferred embodiment the sensor 16 is a PIR sensor.

A lens 20 is positioned in front of and in the field of view of the PIR sensor 16 for focusing infrared radiation. When the PIR sensor is used, the lens 20 is preferably a fresnel lens, however, the lens 20 can vary with the type of sensor 16 used. When a PIR sensor is used, the lens focuses IR in the lens field of view to a focal point at the sensor. An adapter 22 is provided for holding the lens 20 securely in place using lens clips 24 to secure the ends of the lens 20. Additionally, the adapter 22 optimally positions the lens 20 relative to the sensor 16 so that the focal point of the lens 20 is optimized for the sensor 16. The front housing member 14 also includes a window 26, in which the lens 20 is positioned and through which the sensor 16 can view the ambient environment. Except for adapter 22 and its connection to circuit board 18, the structure and functioning of sensor module 10 is generally known in the art.

The adapter 22 has a cover or shroud assembly 27 that shrouds the sensor 16, and a funnel portion 48. The shroud assembly 27 has a shroud 28 and projections 30. Shroud 28 is substantially cylindrical in shape, with one end attached to the funnel portion 48 and another, opposite end extending out from the funnel portion 48 towards the location of the sensor 16. The shroud 28 can be fabricated from the same polymeric material as the adapter 22 and can be an integrally formed to be one-piece with the rest of the adapter 22. The size of the shroud 28 is predetermined to shield the sensor 16 from air currents and extends far enough down the sides of the sensor 16 towards circuit board 18 to shield the sensor 16 from the air currents. The shroud 28 can extend down and contact the board 18 around 360° of the sensor 16, thus, completely cutting off any possibility of air currents affecting sensor 16 from the sides of sensor 16. As illustrated, the shroud 28 is spaced from circuit board 18, although the shroud 28 is sufficiently covering the sensor to provide sufficient protection from air currents from the side.

Projections 30 extend from the shroud bottom 29 of the shroud 28 for insertion through the circuit board 18. These projections position the shroud 28, and therefore the adapter 22 relative to the sensor 16 and circuit board 18. Projections 30 also allow for a gap between the shroud 28 and circuit board 18. The amount of gap can vary from allowing the end of shroud 28 to be flush with circuit board 18 and completely enclose the sides of sensor 16 to the gap being predetermined separation between the end of the shroud 28 and circuit board 18.

Figure 5:
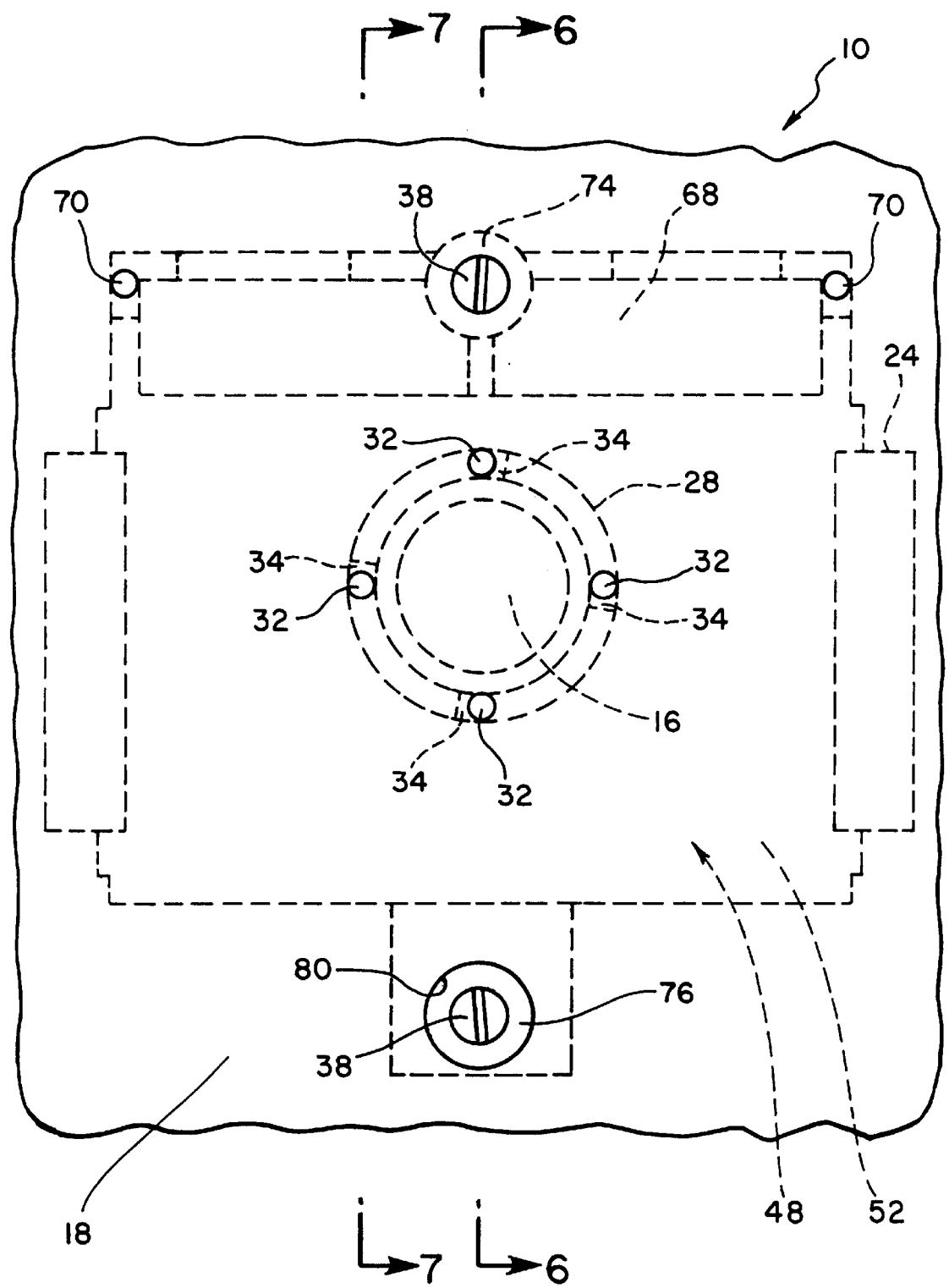
FIG. 5 is a rear view of the adapter attached to the circuit board and constructed in accordance with the present invention.
Figure 6:
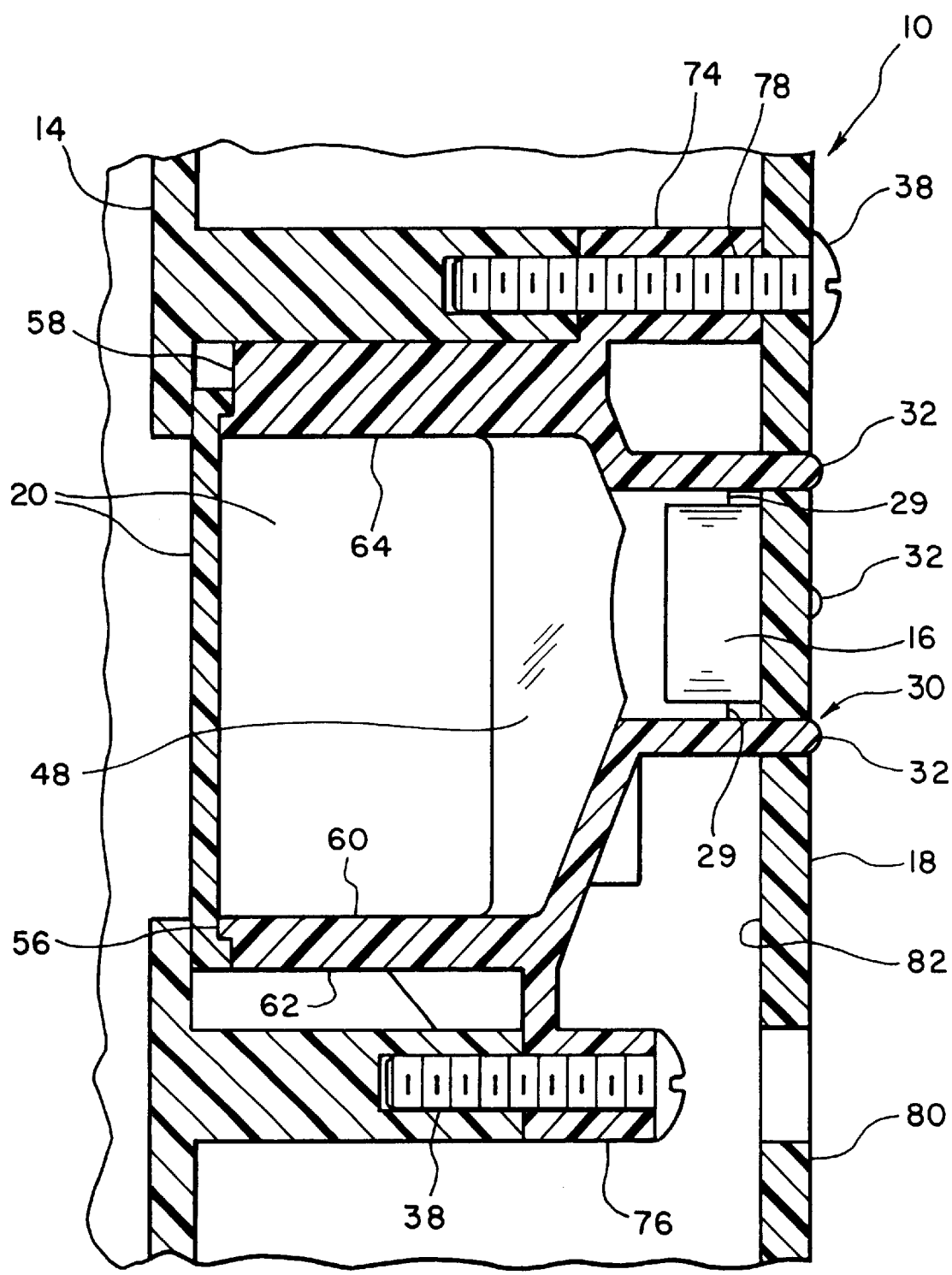
FIG. 6 is a cross-sectional side view of the adapter attached to the circuit board taken along line 6—6 in FIG. 5.
Figure 7:
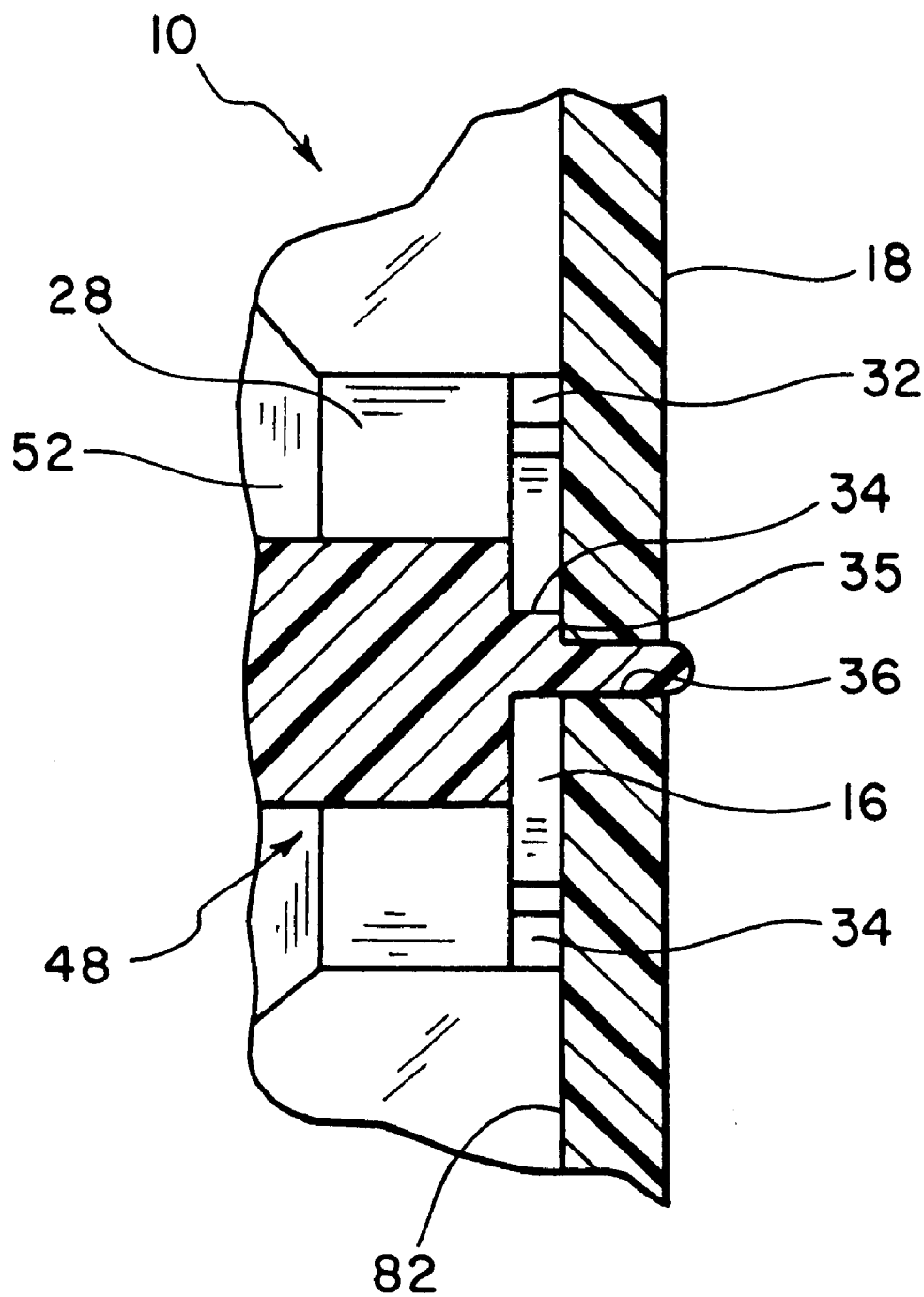
FIG. 7 is a close-up cross-sectional view of the adapter attached to the circuit board taken along line 7—7 in FIG. 5 illustrating the first portion of a projection going through the circuit board and a second portion of the projection limiting the passthrough of the first portion.

As seen in FIGS. 5–7, projections 30, attached to the shroud bottom 29, extend through the circuit board 18, while maintaining the shroud 28 a predetermined distance from circuit board surface 82. Optionally, the shroud bottom 29 can contact the surface 82 of the circuit board 18.

As seen in FIG. 7, the first portion 32 of a projection 30 extends through the circuit board 18. The second portion 34 limits the passing through of the projection 30 through the circuit board 18, while the first portion 32 passes through the circuit board 18 unhindered. Second portion 34 has a substantially flat portion 35, which abuts the substantially flat upper surface 82 of board 18.

Four projections 30, each having a first portion 32 and a second portion 34, position the adapter 22, and therefore the lens 20, a predetermined distance from the sensor 16. Although four projections 30 are shown, any number can be used. The first portion 32 of the projections 30 are inserted through projection holes 36 in the circuit board 18. The projection holes 36 allow for proper positioning of the adapter 22 for stability and optimum positioning of the adapter 22 with respect to the sensor 16. The second portion 34 limits the distance the projections 30 can travel through the circuit board 18. Thus, the second portion 34 acts as a stop for the projections 30 since it abuts the surface of the circuit board 18 and does not fit in hole 36. The second portions 34 are substantially flush with the surface of the circuit board 18 when adapter 22 is fully coupled to circuit board 18. The distance each first portion 32 is allowed to pass through their respective projection hole 36 in the circuit board 18 determines the length of the second portion 34. In this manner, a sensor module 10 can be designed whereby the adapter 22 is fabricated to place the lens 20 at a pre-focused location relative to the sensor 16. Mounting screws 38 attach the adapter 22 to the circuit board 18 and the front housing 14, and keep the projections 30 in holes 36.

By trimming the second portion 34, the distance of the lens 20 from the sensor 16 can be adjusted. The second portion 34 can be trimmed manually by cutting or otherwise removing a segment after it is fabricated. Alternatively, the manufacturing mold can be adjusted or a new mold fabricated as required. The first portion 32 is preferably integral and one-piece with the entire projection 30. Alternatively, a first portion 32 having a predetermined length can be attached to the projections 30.

Figure 3:
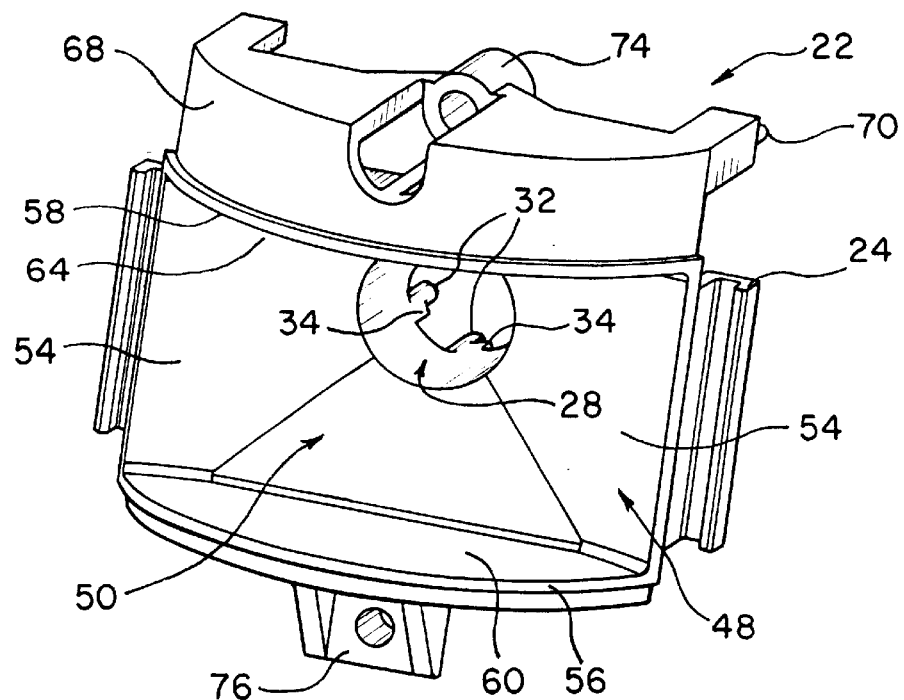
FIG. 3 is a front, side, top perspective view of the adapter in accordance with the present invention.
Figure 4:
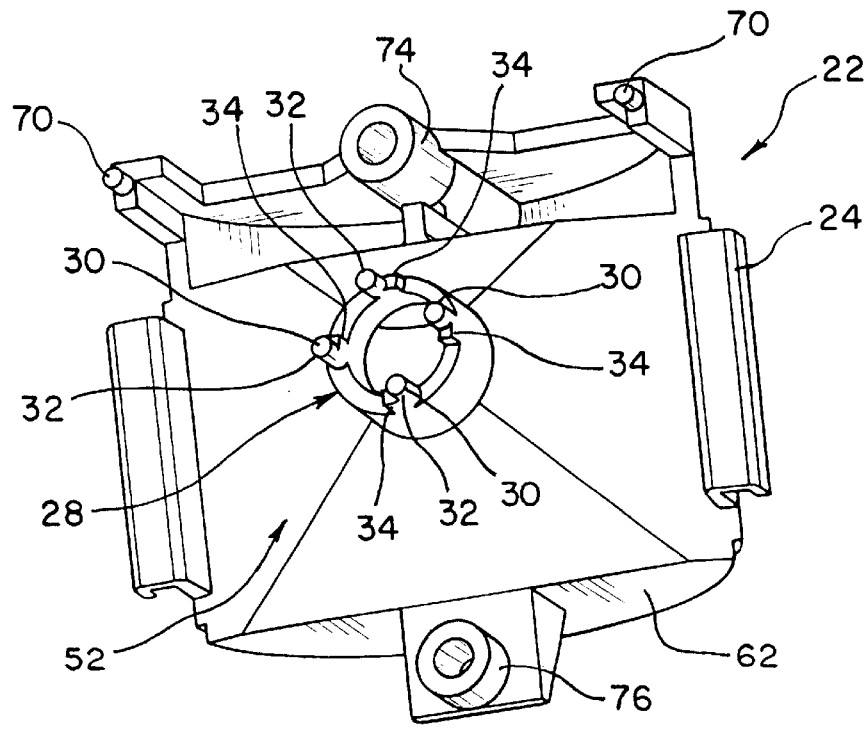
FIG. 4 is a rear, side, bottom perspective view of the adapter in FIG. 3.

As seen in FIGS. 3 and 4, the adapter 22 has an extension or funnel-shaped portion 48, the wider funnel opening occurring on the funnel front side 50 and the smaller funnel opening occurring on the funnel rear side 52. The funnel-shaped portion 48 permits maximum viewing by the sensor 16 of the ambient environment while blocking the flow of air. The funnel-shaped portion 48 can have multiple flat surfaces, multiple curved surfaces, a single curved surface, or a combination of flat and curved surfaces in order to tailor the range of view of the sensor 16 through the window 26 in the front housing 14. FIGS. 3 and 4 show the funnel-shaped portion 48 having four flat walls 54. When the sensor module 10 is assembled, the funnel front side 50 is covered by the lens 20. The funnel-shaped portion 48, indeed the entire adapter 22 including shroud 28 and its projections 30, can be integrally fabricated from a single piece of plastic using, for example, injection molding techniques. The adapter 22 and the funnel-shaped portion 48 can also be fabricated from other materials using techniques known in the art, and can be formed from many pieces fit together.

The front of the adapter 22 is generally curved to maximize the lateral viewing range of the lens 20 and the sensor 16. Also at the front of the adapter 22 are a bottom shelf 56 and a top shelf 58. Shelf 56 has an inside surface 60 facing the funnel-shaped portion 48, and an opposite facing outer surface 62. Shelf 58 has an inside surface 64 facing the funnel-shaped portion 48, and an opposite facing outer surface 66. These shelves 56, 58 also act to minimize air flow, as well as being a spacer between the top and bottom of the lens 20 and the funnel-shaped portion 48. Attached to the outer surface 66 of the top shelf 58 is a header 68. The header 68 has two rearward facing stabilizing pins 70 situated on opposite sides of the header 68. When the adapter 22 is attached to the circuit board 18, the stabilizing pins 70 are inserted into stabilizing pin holes 72, thereby preventing the adapter from rocking or other movement relative to the circuit board 18.

A first adapter mounting screw boss 74 is also located on the header 68. A second adapter mounting screw boss 76 is attached to the outer surface 62 of the bottom shelf 56. These bosses 74, 76 allow the mounting screws 38 to mount the adapter 22 between the circuit board 18 and the front housing 14.

In FIG. 6, the first mounting screw boss 74 is flush with the circuit board 18, while the second mounting screw boss 76 is not flush with the circuit board 18. In this configuration of the preferred embodiment, a mounting screw 38 passes through a first mounting screw slot 78, through the first mounting boss 74 and attaches to the front housing 14. A second mounting screw slot 80 allows a user access to a second mounting screw 38, which passes through the second mounting screw boss 76 and attaches to the front housing 14. Alternatively, a longer second mounting screw can be used in order to pass the second mounting screw through the circuit board 18 as well as the second mounting screw boss 76. The circuit board 18 is fixedly attached to the front housing 14 using mounting screws 38. The rear housing 12 can be pivotally attached to the front housing 14 by a hinge. In this manner, the rear housing 12 can pivot about the hinge and enclose the circuit board 18, the sensor 16, and the adapter 22 within the front housing 14 and rear housing 12. A tab 42, located at the top of the front housing 14, has a series of tab holes 44 which engage a pin 46 on the rear housing 12. Engagement of the tab 42 with the pin 46 latches the front housing 14 with the rear housing 12.

Alternatively, projection 30 can be attached to the first adapter mounting screw boss 74 to set the predetermined distance between the sensor 16 and the lens 20. In this manner, the projection 30 limits how close the adapter 22 can get to the circuit board 18, and therefore limiting the distance of the lens 20 to the sensor 16.

Furthermore, the first adapter mounting screw boss 74 and mounting screw 38 can be replaced with a snap-fit alternative, that is, the circuit board 18 and the adapter 22 can be snap-fit together such that the adapter 22 is maintained a predetermined distance from the circuit board 18. This results in the lens 20 being maintained a predetermined distance from the sensor 16.

Other attachment means that are known in the art can be used between the adapter 22 and the circuit board 18 that will result in the lens 20 being a predetermined distance from the sensor 16.

While only one advantageous embodiment has been chosen to illustrate the invention, it will be understood by those skilled in the art that various changes and modifications can be made therein without departing from the scope of the invention as defined in the appended claims.

What is claimed is:

1. An adapter, comprising:
   a cover having a wall forming a hollow cavity;
   an extension coupled to and extending from said cover, said extension having a first portion and a second portion, said second portion being substantially cylindrically shaped, and said first portion having a front side with a first opening and a back side with a second opening, said second opening being smaller than said first opening, said extension being attached to said cover at said back side with said second opening being aligned with said hollow cavity of said cover;
   a sensor substantially enclosed within said second portion; and
   a plurality of projections coupled to and extending from said cover, each of said projections being spaced from each other and projecting from said cover.

2. The adapter of claim 1, wherein
   said extension further comprises a plurality of walls, each of said walls converging towards said second opening and diverging towards said first opening.

3. The adapter of claim 1, wherein
   said adapter is an integral, one-piece structure.

4. The adapter of claim 3, wherein
   said adapter is formed from plastic.

5. The adapter of claim 1, wherein
   each of said projections has a first portion and a second portion, with said first portion extending away from said cover further than said second portion.

6. The adapter of claim 5, wherein
   said adapter is an integral, one-piece structure.

7. The adapter of claim 6, wherein
   said plurality of projections is four projections.

8. An sensor assembly, comprising:
   a circuit board;
   a sensor coupled to said circuit board;
   an adapter coupled to said circuit board and having a cover, an extension, and at least one projection, said cover having a wall substantially surrounding said sensor, said extension coupled to and extending from said cover and having a front side with a first opening and a back side with a second opening, said second opening being smaller than said first opening, said extension being attached to said cover at said back side with said second opening being aligned with said sensor, and said at least one projection coupled to said cover and attached directly to said circuit board.

9. The assembly of claim 8, further comprising:
   a lens coupled to said extension, positioned over said first opening.

10. The assembly of claim 9, wherein
    said lens is a fresnel lens.

11. The assembly of claim 8, wherein
    said wall is substantially cylindrical.

12. The assembly of claim 8, wherein
    said at least one projection extends completely through said circuit board.

13. The assembly of claim 8, wherein
    said at least one projection has a first portion and a second portion, with said first portion extending away from said cover further than said second portion.

14. The assembly of claim 13, wherein
    said sensor is directly attached to a generally planar surface of said circuit board and,
    said first portion of said at least one projection extends completely through said circuit board and said second portion abuts said planar surface.

15. The assembly of claim 13, wherein
    said extension further comprises a plurality of wall panels converging towards said first opening and diverging towards said second opening.

16. The assembly of claim 13, wherein
    said sensor is an infrared detector.

17. The assembly of claim 8, wherein
    said adapter is an integral, one-piece structure.

18. The assembly of claim 17, wherein
    said adapter is formed from molded plastic.

19. The assembly of claim 8, wherein said plurality of projections is four projections.

20. A sensor assembly, comprising:

a circuit board;

a sensor coupled to said circuit board;

an adapter coupled to said circuit board, said adapter including a funnel having a front side with a first opening and a back side with a second opening, said second opening being smaller than said first opening, and a means for accurately positioning said lens relative to said sensor and for prohibiting air currents from interfering with the function of said sensor; and a lens coupled to said adapter.

21. The sensor assembly of claim 20, wherein said means includes a cover coupled to said funnel and extending between said funnel and said circuit board.

22. The sensor assembly of claim 21, wherein said cover is substantially in the form of a cylinder.

23. The sensor assembly of claim 22, wherein said sensor is directly attached to a generally planar surface of said circuit board and, said cover has at least one projection extending towards said circuit board with said at least one projection having a first portion extending completely through said circuit board and a second portion abutting said planar surface.

* * * * *